United States Patent [19]

Leitner et al.

[11] 4,349,655
[45] Sep. 14, 1982

[54] WATER-DILUTABLE BINDERS CARRYING OXAZOLIDINE GROUPS

[75] Inventors: Wolfgang Leitner; Georg Pampouchidis; Anton Bleikolm, all of Graz, Austria

[73] Assignee: Vianova Kunstharz, A.G., Werndorf, Austria

[21] Appl. No.: 201,983

[22] Filed: Oct. 29, 1980

[30] Foreign Application Priority Data

Nov. 5, 1979 [AT] Austria .................................. 7081/79

[51] Int. Cl.³ ............................................ C08G 18/00
[52] U.S. Cl. ...................................... 528/45; 528/73
[58] Field of Search .................................. 528/73, 45

[56] References Cited

U.S. PATENT DOCUMENTS

| | | | |
|---|---|---|---|
| 4,002,601 | 1/1977 | Hajek et al. | 528/73 |
| 4,174,332 | 11/1979 | Hönig et al. | 260/29.2 TN |
| 4,238,594 | 12/1980 | Pampouchidis | 528/69 |
| 4,278,580 | 7/1981 | Schmölzer et al. | 528/73 |
| 4,282,128 | 8/1981 | Pampouchidis et al. | 528/73 |

*Primary Examiner*—Maurice J. Welsh
*Attorney, Agent, or Firm*—A. W. Breiner

[57] ABSTRACT

Binders water-dilutable upon neutralization with inorganic and/or organic acids comprising the reaction product of (A) a monoadduct of an N-hydroxyalkyloxazolidine and a diisocyanate with (B) a hydroxyl group containing polymer, the ratio of (A) and (B) adjusted to provide a final product with an amine value sufficient to provide water dilutability upon acid neutralization, and a process for the formation of the binders, is described. The binders, upon stoving, provide films with good resistance characteristics and have reduced losses.

24 Claims, No Drawings

WATER-DILUTABLE BINDERS CARRYING OXAZOLIDINE GROUPS

This invention is directed to water-dilutable paint binders. More particularly, the invention is directed to water-dilutable binders and to a process for producing said water-dilutable binders carrying oxazolidine groups and which are particularly suitable for the formulation of cathodically depositable binders.

U.S. Pat. No. 4,174,332 and co-pending applications Ser. No. 816,936 filed July 19, 1977, now U.S. Pat. No. 4,238,594; Ser. No. 860,131 filed Dec. 13, 1977, and Ser. No. 860,145 filed Dec. 13, 1977, disclose the introduction of the basic groups into hydroxy group carrying polymer molecules which are necessary for their cathodic deposition through intermediates carrying one free isocyanate group and at least one basic nitrogen group. The monoisocyanate compounds, according to the aforesaid patent and applications, are prepared by reacting di- and polyisocyanates with a corresponding quantity of dialkylalkanolamines. Upon stoving of the electrophoretically deposited films based on the aforesaid polymers, the aforementioned amines are split off to a certain extent with consequent losses which have to be eliminated from the exhaust air of the stoving equipment.

The same or similar problem is observed with products described, for example, in German Offenlegungsschrift 20 57 799 or German Auslegeschrift 22 52 536 and 22 65 195, where cathodically deposited coating compositions are crosslinked through urethane formation after splitting off the masking agent from blocked isocyanates.

It is an object of the present invention to provide binders for cathodic electrodeposition which in their resistance characteristics meet the requirements of the consumers, particularly in the automobile industry and which, on the other hand, show reduced losses on stoving. It has been found according to this invention that these requirements can be met by forming and using monoadducts of N-hydroxyalkyloxazolidines to organic diisocyanates to thereby introduce basic functional groups into a polymer molecule carrying hydroxy groups.

The present invention is, therefore, directed to a process for producing binders water-dilutable upon total or partial neutralization with inorganic and/or organic acids, and to the binders which can be used particularly in cathodically depositable coating compositions, based on resin-like polycondensation compounds, polymerization compounds, and polyaddition compounds. The process is characterized in that (A) 1 mole of a dialkanolamine with from 0.8 to 1.3, preferably from 1.0 to 1.2, moles of an aldehyde or of a ketone with up to 6 carbon atoms in the alkyl radical, is reacted in known manner at temperatures of up to a maximum of 130° C., to give an N-hydroxyalkyloxazolidine, (B) the N-hydroxyalkyloxazolidine is then reacted at a maximum temperature of 30° C. with 1 mole of an aromatic and/or cycloaliphatic and/or aliphatic diisocyanate until an NCO-value corresponding to a monoadduct is attained, and (C) the obtained monoadduct is linked at 20° to 120° C. via the free isocyanate group to the hydroxyl groups of a polycondensation resin, polymerization resin or polyaddition resin, whereby component (B) is used in a quantity to give a final product with an amine value of between 30 and 100 mg KOH/g.

Surprisingly, on stoving, the products of the invention split off a considerably reduced quantity of decomposition products. Furthermore, a film having good characteristics is formed at stoving temperatures as low as 130° C., which means that in comparison with the products of the prior art stoving temperature and/or stoving time can be reduced.

It is theorized that the aforesaid surprising effect is obtained in that the oxazolidine ring, under the effect of water in the acid medium, is split, the following reaction believed to occur:

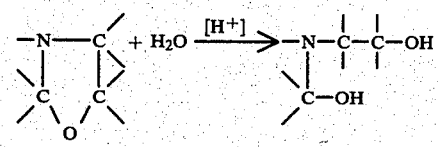

From the results obtained with the products of the invention it appears justified to assume that the advantageous characteristics of the products are to a substantial degree due to the reactivity of the optionally substituted N-methylol groups.

The preparation of the N-hydroxyalkyloxazolidines employed according to this invention is effected in known manner by reaction of dialkanolamines and aldehydes or ketones at a maximum temperature of 130° C., water being split off. Suitable dialkanolamines preferably are diethanolamine and diisopropanolamine. Optionally, dialkanolamines with longer alkyl radicals may also be used. As the carbonyl component, preferably formaldehyde is used; however, higher aldehydes or ketones with up to 6 carbon atoms in the alkyl radical may be employed. For the preparation of the monoadduct from the hydroxyalkyloxazolidine and the diisocyanate, it is essential that no or only minor quantities of unreacted dialkanolamine are present in the reaction product. Residual amines are removed in simple manner by reacting the oxazolidine, according to the quantity of free amine, with from 0.1 to 0.3 moles of an alkyl acrylate, such as ethyl acrylate or a propyl acrylate or butyl acrylate or ethylhexylacrylate, at 40° to 100° C., during a period of from 30 minutes to 5 hours.

The thus obtained N-hydroxyalkyloxazolidine substantially free from amino hydrogen atoms is subsequently reacted with a diisocyanate in a ratio whereby only half of the isocyanate groups react with the hydroxy groups of the N-hydroxyalkyloxazolidine. Suitable diisocyanates are the known and available aromatic, cycloaliphatic and aliphatic compounds of these groups, preferably toluene diisocyanate, isophorone diisocyanate, hexamethylene-1,6-diisocyanate, and the like. During the reaction, the temperature must not exceed 30° C. It is advantageous to slowly add the N-hydroxyalkyloxazolidine to the diisocyanate; since, on the one hand, a strongly exothermic reaction and, on the other hand, also a too high concentration of free oxazolidine is prevented. Furthermore, it is advantageous to dilute the blend of isocyanate and hydroxyalkyloxazolidine with an isocyanate inert solvent. For this purpose esters, ketones, aromatic solvents, and the like, or blends of these, can be used. The period of addition should not be longer than 1 hour, preferably 30 minutes.

Furthermore, the adduct should be reacted further immediately after the end of the addition.

In a special embodiment allowing a simple and safe reaction, and also a reaction which enhances the stability of the intermediate, a part of the oxazolidine is replaced by a hydroxyalkyl(meth)acrylate. In the preparation of this "mixed adduct," 5-40 mole percent of oxazolidine per mole of diisocyanate is replaced by a hydroxyalkyl(meth)acrylate which is either subsequently or simultaneously reacted with the oxazolidine and the diisocyanate. In this manner additional cross-linking sites for thermal polymerization are introduced into the binder entraining a higher crosslinking density in the stoved film.

The N-hydroxyalkyloxazolidine-diisocyanate monoadduct is reacted with either a hydroxy functional polycondensation resin, or a polymerization resin, or a polyaddition resin to provide a binder which is water-soluble upon partial or total neutralization of the basic groups; which, for having sufficient dilutability, should have an amine number of between 30 and 100 mg KOH/g. To obtain optimal crosslinking density preferably such polycondensation, polymerization, or polyaddition resins are those which carry polymerizable bonds in addition to the hydroxyl groups. The preferred starting resins for the reaction with the monoadducts are the reaction products of epoxy resins with unsaturated carboxylic acids, such as the epoxy acrylates, or reaction products of carboxy group containing copolymers with glycidyl(meth)acrylate, or unsaturated polyester resins. The reaction is carried out at temperatures of from 20° to 120° C., optionally in the presence of isocyanate inert solvents. The reaction proceeds rapidly even without catalysts. The progress of the reaction is monitored through determination of the NCO-value, which should be below 0.1% at the end of reaction. After the reaction, other than isocyanate inert solvents can be used for diluting the binder. The binders can be worked in known manner with pigments, and upon partial or total neutralization with inorganic or organic acids to a pH-value of between 4 and 6.5. The binders are preferably diluted with deionized water to a solids content of between 5 to 20%, to provide a ready-to-use bath material.

The conditions for deposition on a cathodic substrate are those known to those skilled in the art. Film formation with the binders of the invention takes place at a temperature of from 140° C. upwards. Optimum resistance characteristics are obtained with a stoving schedule of from 10-30 minutes at 160°-180° C.

The following examples illustrate the invention without limiting its scope. Parts or percentages refer to weight, if not otherwise stated.

(A) Preparation Of N-hydroxyalkyloxazolidines (a) N-2-hydroxyethyloxazolidine (HETOX)

105 g of diethanolamine and 33 g of paraformaldehyde are mixed and, with toluol as the solvent reaction medium, are slowly heated to 120° C. When water formation is finished, the solvent is vacuum-stripped.

(b) N-2-hydroxypropyl-5-methyl-oxazolidine (HIPOX)

133 g of diisopropanol amine and 33 g of paraformaldehyde are reacted as described under (a).

The N-hydroxyalkyloxazolidines thus prepared, in order to remove final traces of free amine, are blended with the quantities of an alkylacrylate listed in Table 1 and reacted for 2 hours at 70° C.

TABLE 1

|  | HETOX | HIPOX | ETAC | BUAC | ETHEXAC |
|---|---|---|---|---|---|
| A 1 | 117 | — | 10 | — | — |
| A 2 | 117 | — | 20 | — | — |
| A 3 | 117 | — | — | 12.8 | — |
| A 4 | 117 | — | — | 25.6 | — |
| A 5 | 117 | — | — | 38.5 | — |
| A 6 | 117 | — | — | — | 36.9 |
| A 7 | — | 145 | 10 | — | — |
| A 8 | — | 145 | 30 | — | — |
| A 9 | — | 145 | — | 12.8 | — |
| A 10 | — | 145 | — | 38.5 | — |
| A 11 | — | 145 | — | — | 18.4 |

ETAC: Ethylacrylate
BUAC: Butylacrylate
ETHEXAC: 2-ethylhexylacrylate (B) Preparation Of The Monoiscyanate Adducts Table 2 lists the weight ratios, procedures, and characteristics for the monoisocyanate adducts.

TABLE 2

|  | Method | TDI | IPDI | HMDI | Oxazolidine |  | HEMA | % Solids In AEGLAC | NCO Theoret. In % | NCO Pract. In % | MW |
|---|---|---|---|---|---|---|---|---|---|---|---|
| B 1 | 2 | 217.5 | — | — | 127 | A 1 | 32.5 | 80 | 13.9 | 13.6 | 377 |
| B 2 | 1 | 174 | — | — | 155.5 | A 5 | — | 60 | 12.8 | 12.5 | 329 |
| B 3 | 4 | 191.4 | — | — | 153.9 | A 6 | 13.0 | 60 | 12.9 | 12.9 | 358 |
| B 4 | 3 | 174 | — | — | 175 | A 8 | — | 60 | 12.0 | 12.1 | 349 |
| B 5 | 2 | 208.8 | — | — | 157.8 | A 9 | 26.0 | 80 | 12.8 | 12.4 | 393 |
| B 6 | 4 | 200.1 | — | — | 163.4 | A 11 | 19.5 | 60 | 12.6 | 12.5 | 383 |
| B 7 | 4 | — | 244.2 | — | 137 | A 2 | 13.0 | 60 | 11.7 | 11.6 | 394 |
| B 8 | 4 | — | 244.2 | — | 142.6 | A 4 | 13.0 | 80 | 11.6 | 11.6 | 400 |
| B 9 | 2 | — | 266.4 | — | 163.4 | A 11 | 26.0 | 80 | 11.1 | 11.0 | 456 |
| B 10 | 1 | — | 222 | — | 175.0 | A 8 | — | 80 | 10.6 | 10.3 | 397 |
| B 11 | 4 | — | — | 184.8 | 137.0 | A 2 | 13.0 | 80 | 13.8 | 13.7 | 335 |
| B 12 | 4 | — | — | 201.6 | 229.8 | A 3 | 26.0 | 80 | 11.0 | 11.1 | 457 |
| B 13 | 4 | — | — | 193.2 | 163.4 | A 11 | 19.5 | 60 | 12.8 | 12.6 | 376 |
| B 14 | 4 | — | — | 168 | 183.5 | A 10 | — | 60 | 12.0 | 11.8 | 352 |

TDI: Available blend of 2,4- and 2,6-tolylenediisocyanate (80:20)
IPDI: Isophoronediisocyanate
HMDI: Hexamethylene-1,6-diisocyanate
HEMA: Hydroxyethylmethacrylate Method 1

Diisocyanate and monoethyleneglycol monoethylether acetate (AEGLAC) are charged to a reaction vessel. The hydroxyalkyloxazolidine is added dropwise over a period of 30 minutes while cooling in order that the temperature does not exceed 30° C.

Method 2

Diisocyanate and AEGLAC are charged to a reaction vessel. The hydroxyalkyloxazolidine is added dropwise over a period of 30 minutes in order that the temperature does not exceed 30° C. Then hydroxyethylmethacrylate is added.

Method 3

AEGLAC and half the total quantity of diisocyanate are charged to a reaction vessel. The hydroxyalkyloxazolidine and the second half of diisocyanate are added separately at the same time, over a period of 30 minutes, in order that the temperature does not exceed 30° C.

Method 4

As in Method 3, followed by the addition of hydroxyethylmethacrylate.

Determination Of The NCO-Value

About 0.5–1 g of a sample are weighed out in an Erlenmeyer flask, dissolved in acetone, and a few drops of bromophenol-blue (in acetone) are added as indicator. The now blue solution is back-tritrated to yellow with 0.5 N HCl (in water). Then 10 ml of Kappelmeier reactant are added. After 1–2 minutes, the excess amine is back-titrated with 0.5 N HCl (in water) (color change: blue→yellow).

Calculation:

$$\frac{B - C}{W \cdot S} \times 0.5 \times 4.2 \times 100 = \% \text{ NCO}$$

B: ml 0.5 N HCl, blank
C: ml 0.5 N HCl consumed (after Kappelmeier reactant)
W: Weigh-out in g
S: Solids content Kappelmeier Reactant 64.4 g (0.5 mol) of diisobutylamine, dissolved in 940 ml of acetone.

(C) Hydroxy Group Containing Starting Resins (C 1) 400 g of an epoxy resin with an equivalent weight of 185–195, on the basis of Bisphenol A, are dissolved in 240 g of AEGLAC and reacted with 158 g of an equimolar blend of acrylic and methacrylic acid, at 110° C., until an acid value of below 3 mg KOH/g is reached.

(C 2) 200 g of an epoxy resin of the Bisphenol A type (equivalent weight 185–195) and 350 g of an aliphatic epoxy resin with an epoxy equivalent weight of 310 to 340 are reacted with 144 g of acrylic acid, 70% in ethyleneglycolmonoethylether acetate, at 110° C., until an acid value of below 3 mg KOH/g is reached.

(C 3) 1100 g of an epoxy resin based on Bisphenol A (EW=480 to 550), 400 g of an epoxy resin based on Bisphenol A (EW=200) and 344 g of methacrylic acid, in 461 g of methylisobutylketone are reacted as described under (C 1).

(C 4) 500 g of polybutadiene-maleic anhydride-adduct (maleic anhydride equivalent weight=500) and 130 g of hydroxyethylmethacrylate are reacted at 115° C. until the theoretical acid value of the semiester is reached. Then, 142 g of glycidylmethacrylate are added. Esterification is continued to an acid value of below 5 mg KOH/g.

(C 5) A copolymer is prepared from 300 g of styrene, 144 g of acrylic acid, 116 g of hydroxyethylacrylate and 130 g of hydroxyethylmethacrylate. When the polymerization catalyst has been removed, 284 g of glycidylmethacrylate are added and the esterification is continued at 110° C., until an acid value of below 5 mg KOH/g is reached.

(C 6) A saturated polyester with free hydroxy groups is prepared from 100 g of adipic acid, 16 g of diethyleneglycol, 59 g of trimethylolpropane, and 63 g neopentylglycol, the reaction water being removed by azeotropic distillation. 120 g of a reaction product of equimolar quantities of tolylene diisocyanate and hydroxyethylmethacrylate are added. The reaction charge is held at 60° C. until the NCO-value has fallen below 0.1%.

(C 7) A carboxy group containing unsaturated polyester is prepared from 100 g of adipic acid, 98 g of maleic anhydride, 18 g of hexane diol, and 40 g of trimethylolpropane. 120 g of glycidylmethacrylate are added and the esterification continued until an acid value of below 5 mg KOH/g is reached.

(C 8) 700 g of an epoxy novolak, containing about 3.6 moles of epoxy groups, are reacted at 100° C., with 252 g acrylic acid in 408 g of AEGLAC, until the acid value has fallen below 3 mg KOH/g.

(D) Preparation Of The Binders Of The Invention

Examples 1–16: The hydroxy group containing resins (Component C) are reacted with the isocyanate adducts (Component B) in the weight ratios listed in Table 3 (quantities are resin solids) to provide the final binders. The reaction is carried out in a 70% solution of AEGLAC, at 60° to 70° C., until an NCO-value of below 0.1% is needed. Then the resins are diluted with monoethyleneglycol monoethylether to a solids content of 60% by weight. The testing and evaluation of the binders in cathodic electrodeposition paints (KETL) are presented in Table 4.

TABLE 3

| Example | Component B | | Component C | | DBN | Amine Value |
|---|---|---|---|---|---|---|
| 1 | 754 | 1 | 558 | 1 | 1.5 | 85.4 |
| 2 | 698 | 4 | 694 | 2 | 1.4 | 80.5 |
| 3 | 603 | 11 | 694 | 2 | 1.5 | 77.7 |
| 4 | 1367 | 9 | 1844 | 3 | 1.3 | 52.3 |
| 5 | 393 | 5 | 772 | 4 | 0.9 | 48.0 |
| 6 | 1128 | 13 | 974 | 5 | 1.0 | 79.9 |
| 7 | 264 | 2 | 1120 | 6 | 0.3 | 32.4 |
| 8 | 1000 | 8 | 1844 | 3 | 1.4 | 49.2 |
| 9 | 589 | 5 | 558 | 1 | 1.7 | 73.2 |
| 10 | 358 | 3 | 694 | 2 | 1.9 | 53.2 |
| 11 | 794 | 10 | 974 | 5 | 1.1 | 63.3 |
| 12 | 460 | 6 | 1120 | 7 | 0.5 | 42.5 |
| 13 | 394 | 7 | 772 | 4 | 0.9 | 48.0 |
| 14 | 915 | 12 | 694 | 2 | 1.2 | 69.6 |
| 15 | 377 | 1 | 694 | 2 | 1.9 | 52.3 |
| 16 | 716 | 3 | 952 | 8 | 2.2 | 67.2 |

DBN: Double bond number = number of polymerizable double bonds in 1000 molecular weight units.

The binders are tested by determination of hardness and water resistance of a clear varnish stoved for 30 minutes at 160° C., applied to a degreased but otherwise unpretreated steel panel. The results are listed in Table 4.

For the salt spray test the degreased, untreated steel panels are coated with a pigmented paint (100 parts resin solids, 16 parts aluminium silicate pigment, 2 parts carbon black, 2 parts lead silicate) under conditions to provide a dry film thickness of from 16 to 20 μm. The films are stoved for 30 minutes at 160° C. The results of the ASTM-B 117-64 test show that all coatings at the cross incision have less than 2 mm of corrosion (Scotch tape test) even after 340 hours.

TABLE 4

| Example | Neutralization Quantity[1] | Neutralization Type[2] | Deposition Voltage Rupture | Deposition Voltage Deposition | Hardness[3] | Water Resistance[4] |
|---|---|---|---|---|---|---|
| 1 | 45 m-mole | AS | 300 V | 200 V | 200 s | 400 |
| 2 | 45 m-mole | AS | 280 V | 200 V | 200 s | 400 |
| 3 | 45 m-mole | ES | 300 V | 200 V | 190 s | 400 |
| 4 | 40 m-mole | AS | 300 V | 200 V | 160 s | 400 |
| 5 | 45 m-mole | ES | 250 V | 180 V | 160 s | 400 |
| 6 | 45 m-mole | AS | 270 V | 200 V | 160 s | 380 |
| 7 | 35 m-mole | ES | 300 V | 200 V | 140 s | 370 |
| 8 | 40 m-mole | AS | 300 V | 200 V | 180 s | 400 |
| 9 | 45 m-mole | AS | 300 V | 200 V | 190 s | 400 |
| 10 | 40 m-mole | AS | 300 V | 200 V | 170 s | 380 |
| 11 | 45 m-mole | AS | 280 V | 200 V | 170 s | 370 |
| 12 | 45 m-mole | ES | 270 V | 200 V | 160 s | 360 |
| 13 | 40 m-mole | AS | 280 V | 200 V | 160 s | 380 |
| 14 | 45 m-mole | AS | 300 V | 200 V | 180 s | 400 |
| 15 | 40 m-mole | AS | 270 V | 200 V | 180 s | 400 |
| 16 | 45 m-mole | AS | 260 V | 200 V | 190 s | 400 |

[1]m-moles of acrylic acid per 100 g of resin solids
[2]AS: formic acid; ES: acetic acid
[3]pendulum hardness: DIN 53 157 (seconds)
[4]number of hours until corrosion or blistering appear on water soak (40° C.)

As will be apparent to one skilled in the art, various modifications can be made within the scope of the aforesaid description. Such modifications being within the ability of one skilled in the art form a part of the present invention and are embraced by the appended claims.

It is claimed:

1. Binders water-dilutable upon neutralization with inorganic and/or organic acids, said binders being useful in cathodically depositable coating compositions, comprising the reaction product of
   (A) the monoadduct of (a) an N-hydroxyalkyloxazolidine, said N-hydroxyalkyloxazolidine being the reaction product of 1 mole of a dialkanolamine with from 0.8 to 1.3 moles of an organic compound containing a reactive carbonyl group and having up to 6 carbon atoms in an alkyl radical, said reaction occurring at a maximum temperature of 130° C., and (b) 1 mole of a diisocyanate, said adduct formation occurring by reaction at a maximum temperature of 30° C. until an NCO-value which corresponds to a monoadduct is obtained; and
   (B) a hydroxyl group containing polymer; components (A) and (B) being adjusted to provide a final product having an amine value of from about 30–100 mg KOH/g.

2. The water-dilutable binder of claim 1 wherein said carbonyl-containing component is an aldehyde.

3. The water-dilutable binder of claim 1 wherein the carbonyl-containing component is a ketone.

4. The water-dilutable binder of claim 2 wherein the aldehyde is formaldehyde.

5. The water-dilutable binder of claim 1 wherein said dialkanolamine is a diethanolamine.

6. The water-dilutable binder of claim 1 wherein said dialkanolamine is diisopropanolamine.

7. The water-dilutable binder of claim 1 wherein the diisocyanate is an aliphatic diisocyanate.

8. The water-dilutable binder of claim 1 wherein the diisocyanate is an aromatic diisocyanate.

9. The water-dilutable binder of claim 1 wherein the diisocyanate is a cycloaliphatic diisocyanate.

10. The water-dilutable binder of claim 1 wherein said hydroxyl group containing polymer is a polycondensation resin.

11. The water-dilutable binder of claim 1 wherein said hydroxyl group containing polymer is a polyaddition resin.

12. The water-dilutable binder of claim 1 wherein said hydroxyl group containing polymer is obtained by polymerizing an ethylenically unsaturated monomer.

13. The water-dilutable binder of claim 1 wherein said hydroxyl group containing polymer includes ethylenic unsaturation.

14. The water-dilutable binder of claim 13 wherein the double bond number of said polymer is from 0.1 to 2.5.

15. The water-dilutable binder of claim 1 wherein said monoadduct is a mixed adduct wherein from 5 to 40 mole percent of the N-hydroxyalkyloxazolidine is replaced with a hydroxyalkyl(meth)acrylate per mole of diisocyanate.

16. Process for producing binders water-dilutable upon total or partial neutralization with inorganic and/or organic acids which can be used in cathodically depositable coating compositions comprising the steps of
   (A) reacting 1 mole of a dialkanolamine with from 0.8 to 1.3 moles of an aldehyde or of a ketone having up to 6 carbon atoms in an alkyl radical at temperatures of up to a maximum of 130° C. to provide an N-hydroxyalkyloxazolidine,
   (B) reacting the N-hydroxyalkyloxazolidine of (A) at a maximum temperature of 30° C. with 1 mole of an aromatic and/or cycloaliphatic and/or aliphatic diisocyanate until an NCO-value corresponding to a monoadduct is attained, and
   (C) reacting the monoadduct of (B) at 20° to 120° C. with a hydroxyl group containing polymer, components (A) and (B) being employed in a quantity to provide a final product with an amine value of between 30 and 100 mg KOH/g.

17. Process according to claim 16 wherein the N-hydroxyalkoxazolidine is a reaction product of diethanolamine or diisopropanolamine and formaldehyde.

18. Process according to claim 16 wherein the N-hydroxyalkyloxazolidine prior to reaction with the diisocyanate is reacted with from 0.1 to 0.3 moles of an alkylacrylate, according to the quantity of free amine, at a temperature of from 40° to 100° C., during a period of from 30 minutes to 5 hours.

19. Process according to claim 16 wherein the reaction step (B) is carried out in the presence of an isocyanate inert solvent and through slow addition of the N-hydroxyalkyloxazolidine to the diisocyanate, during a period of not more than 1 hour.

20. Process according to claim 16 wherein step (C) the monoadduct is a mixed adduct wherein from 5 to 40 mole percent of the N-hydroxyalkyloxazolidine is replaced with a hydroxyalkyl(meth)acrylate per mole of diisocyanate.

21. Process according to claim 20 wherein the N-hydroxyalkyl(meth)acrylate is reacted with the diisocyanate simultaneously with the isooxazolidine.

22. Process according to claim 20 wherein N-hydroxyalkyl(meth)acrylate is reacted with the diisocyanate subsequent to the addition of the oxazolidine.

23. Process according to claim 16 wherein the polymer of step (C) includes ethylenic unsaturation.

24. Process of claim 16 wherein said hydroxyl group containing polymer is a member of the group consisting of a polycondensation resin and a polyaddition resin.

* * * * *